Nov. 28, 1967            J. C. JENKINS            3,355,132
STUD WELDING
Filed Sept. 30, 1965                          2 Sheets-Sheet 1
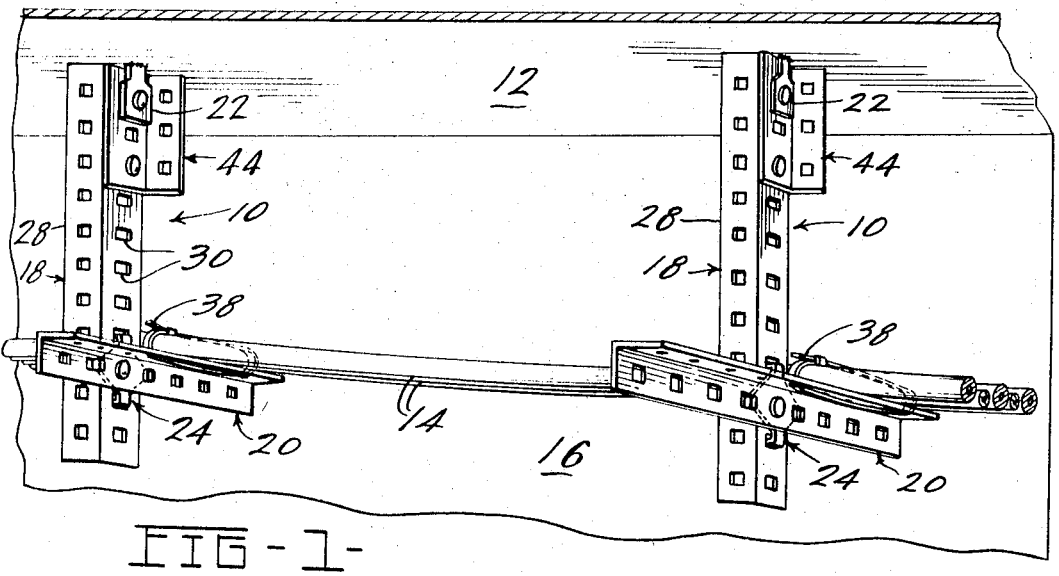
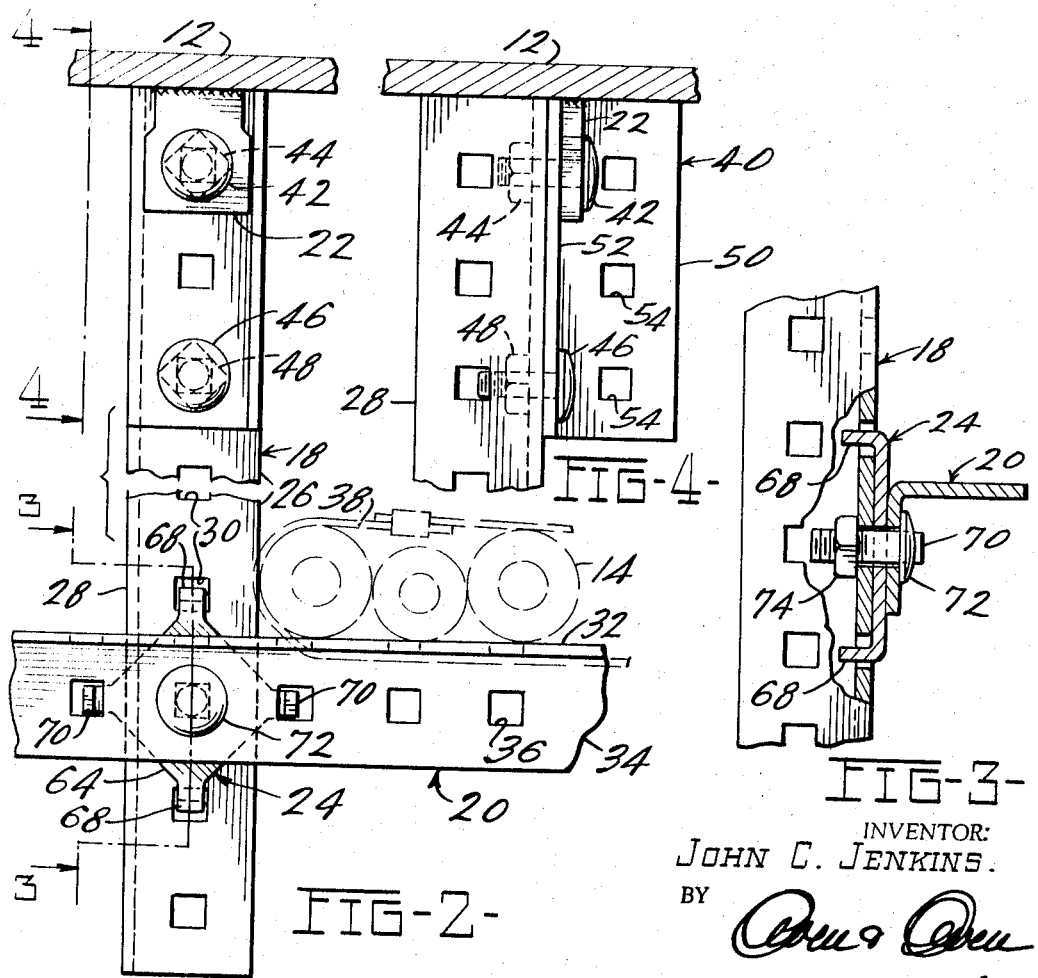
INVENTOR:
JOHN C. JENKINS.
BY
ATT'YS.

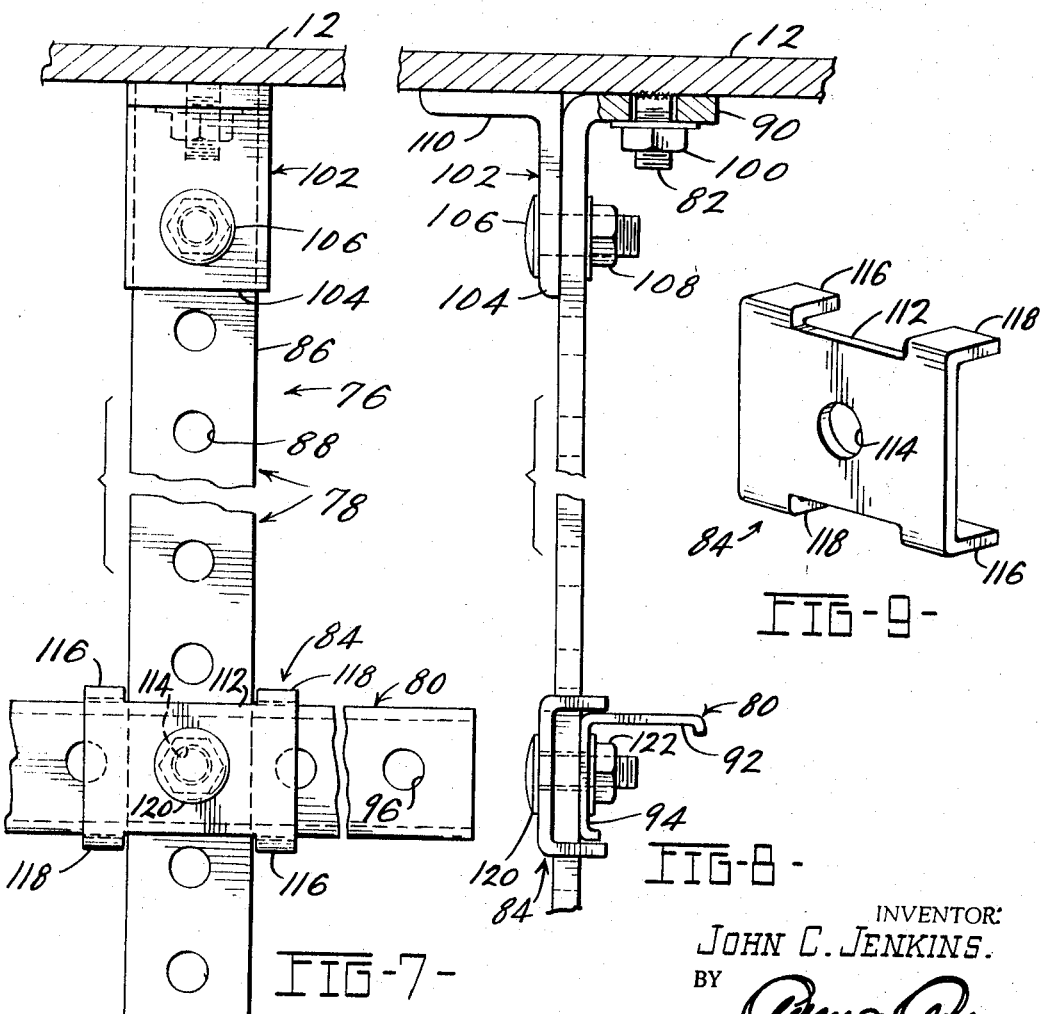

United States Patent Office 3,355,132
Patented Nov. 28, 1967

3,355,132
STUD WELDING
John C. Jenkins, Lorain, Ohio, assignor to Gregory Industries, Inc., Lorain, Ohio, a corporation of Michigan
Filed Sept. 30, 1965, Ser. No. 491,802
12 Claims. (Cl. 248—59)

ABSTRACT OF THE DISCLOSURE

A cable hanger for use on ships is provided which can receive a plurality of cables without the necessity of being threaded through the hanger. The new hanger has a unique connection for connecting mutually perpendicular members of the hanger securely and quickly. The hanger also can be affixed to the ship by a weldable stud which provides rapid and secure installation for the hanger.

---

This invention relates to a cable hanger and more particularly to an improved cable hanger having a number of advantages over those heretofore known.

A multitude of cable hangers of various types are used on ships and large boats. The cable hangers vary widely in size from small ones capable of holding one or two conductors of small diameter to very large ones capable of holding several large cables, each of which may be several inches in diameter. Heretofore, the larger cable hanger basically has included a pair of spaced vertical legs which have been hand welded to a bulkhead or an overhead, usually the latter, with a horizontal supporting member extending between the legs. The two legs, the overhead, and the horizontal member formed a rectangular opening through which the heavy cables were threaded by workmen after the structure was welded in place. The fabrication of the hanger was done by hand and was quite time consuming as was the actual welding of the hangers to the overhead. Further, due to the size and weight of the cables, merely threading them through the cable hangers was a difficult, slow task.

It also has been proposed to produce cable hangers including vertical supports, with outwardly-extending arms which could receive cables without having to be threaded through the hangers. Such cable hangers, however, when of sufficiently large size to support the larger, heavier cables, have not heretofore been of a practical design. Such hangers have either required expensive connections for the horizontal and vertical members or have been prefabricated by hand welding, which again has been an expensive and time consuming process.

The present invention relates to a new cable hanger to which the cables can be easily applied and yet are easy to fabricate and are made of relatively low-cost materials. The hanger constitutes a central vertical supporting member and horizontal cable-receiving members made of relatively inexpensive stock, the members being securely fastened together by inexpensive and easily assembled connectors. The new hangers can be prefabricated quickly by relatively unskilled help. They can be fastened at suitable positions to the overhead by automatically end welding studs thereto and then bolting the hangers to the studs. The hangers are designed such that the cables to be hung can simply be stretched out on the deck below the hangers and then lifted into place, rather than being threaded through each hanger. After the hangers are in place and the cables positioned thereon, the cables can be secured to the hangers by suitable metal straps or other means to complete the overall combination.

It is, therefore, a principal object of the invention to provide an improved cable hanger of lower cost and of simplified design.

Another object of the invention is to provide a cable hanger to which the cables are easily applied and which can be quickly and easily prefabricated.

Another object of the invention is to provide an improved cable hanger which can be assembled to part of a ship by an end welded stud which is first affixed to the ship and the cable hanger subsequently fastened thereto.

Other objects and advantages of the invention will be apparent from the following detailed description of preferred embodiments thereof, reference being made to the accompanying drawings, in which:

FIG. 1 is a fragmentary view in perspective of cable hangers embodying the invention installed in a ship with cables shown supported thereby;

FIG. 2 is a fragmentary front view in elevation of one of the cable hangers shown in FIG. 1 with the cables in dotted lines;

FIG. 3 is an enlarged, fragmentary view in vertical cross section taken along the line 3—3 of FIG. 2;

FIG. 4 is an enlarged, fragmentary view in vertical cross section taken along the line 4—4 of FIG. 2;

FIG. 5 is a view in perspective of a welding stud used to attach the hanger of FIGS. 1–4 to a ship;

FIG. 6 is a view in perspective of a connector which attaches two components of the cable hanger in non-rotatable relationship;

FIG. 7 is a fragmentary front view in elevation of a slightly modified cable hanger embodying the invention;

FIG. 8 is a side view in elevation, with parts broken away and with parts in section, of the cable hanger of FIG. 7; and FIG. 9 is a view in perspective of a modified connector used to attach two components of the hanger of FIGS. 7 and 8 in non-rotatable relationship.

Referring to FIG. 1, two cable hangers 10 embodying the invention are shown attached to an overhead 12 of a ship with several cables 14 supported thereby. The cable hangers 10 also can be attached to a bulkhead 16 of the ship and used in horizontal positions, although they have greater utility when used vertically.

As shown in FIGS. 2–6, each of the cable hangers 10 basically includes a first or vertical elongate member 18, a second or horizontal elongate member 20, a weldable attaching stud 22, and a connection 24. The vertical member 18 as well as the horizontal member 20 can be made of standard stock and, as shown, the member 18 includes a first leg 26 and a side or right-angle leg 28, each of which has a plurality of uniformly-spaced, square holes or openings 30 therealong. It is only necessary, however, that the leg 26 have a top opening by means of which the member 18 can be attached to the stud 22 and three lower openings for the connection 24. The horizontal member 20 similarly includes two legs 32 and 34 each with uniformly-spaced square holes or openings 36. The leg 34 requires only three central openings 36 to receive the connection 24. The upper leg 32, however, should have a number of the openings 36 to receive metal straps or wires 38 which can then be located in a number of positions to receive a variety of sizes and numbers of the cables 14. The straps 38 can extend through two of the spaced holes 36 and around the cables to affix the cables to the horizontal member 20, as is known in the art.

A short stiffening member 40 is located near the upper end of the vertical member 18 and is, in this instance, between the member 18 and the stud 22 with the three fastened together by a bolt 42 and a nut 44. The stiffening member 40 can be further secured to the elongate member 18 by a second bold 46 and a nut 48 located at a lower point, although this is not essential. The stiffening member 40 can be of similar construction to the members 18 and 20 and includes two legs 50 and 52 with a plurality of uniformly-spaced openings 54. The leg 50 of the stiffening member 40 and the leg 28 of the member 18 prevent any tendency for the hanger to bend around the stud 22 in a direction parallel to the longitudinal extent of the cables 14.

The stud 22 has a generally rectangular shank 56 with flat sides to cooperate with the hanger members and with a central hole 58 therethrough for the bolt 42. The stud 22 also has a narrower weldable end 60 with a central projection 62 of solid flux. With this arrangement, the stud 22 can be automatically arc welded to the overhead 12 or even to the bulkhead 16 by an automatic end welding technique as discussed, for example, in Glorioso, Patent No. 3,136,880. The rectangular shank 56 has straight edges, one of which cooperates with the leg 50 of the stiffening member 40, as shown in FIG. 2, to prevent transverse movement of the hanger 10 relative to the longitudinal extent of the cables 14. The members 18, 20 and 40 can have additional side legs so as to be U-shaped in transverse cross section, if desired, in which case the additional leg of the member 40 would cooperate with the opposite edge of the rectangular shank 56 of the stud 22. However, the single side legs are sufficient for stiffening purposes in most instances without the additional legs which primarily would add only additional weight and cost to the hangers.

Referring particularly to FIG. 6, the connection 24 includes a rectangular plate-like portion 64 with a central, square opening 66 therein. A first pair of legs 68 extend in a common direction from the plate-like portion 64 and are directly opposite the openings 66. A second pair of legs 70 extend in a common direction from the portion 64 in a direction opposite to the legs 68 and again are directly opposite the opening 66 with the two pair of legs lying on mutually perpendicular lines. The connection 24 is located between the vertical member 18 and the horizontal member 20 with the three being attached by a bolt 72 and nut 74 (FIG. 3). The bolt 72 extends through one of the openings 36 in the leg 34 of the horizontal member 20, through the central opening 66 in the plate-like portion 64 of the connection 24, and through one of the openings 30 in the leg 26 of the vertical member 18. The legs 68 of the connection 24 then extend through two of the openings 30 on either side of the opening 30 through which the bolt extends while the leg 70 of the connection 24 extends through the openings 36 on either side of the opening through which the bolt extends. The legs 68 and 70 thereby cooperate to prevent rotation of the horizontal member 20 relative to the vertical member 18 which might otherwise occur if the cables 14 are in an unbalanced condition, for example.

The connection 24 is simple and inexpensive as well as easy to install and yet is very effective in rigidly connecting the horizontal and vertical members of the hanger. When the openings 30 of the vertical member 18 are spaced uniformly over the length thereof, the connection 24 and the horizontal member 20 can be placed in any suitable vertical position, as desired. Similarly, with the openings 36 located all along the leg 34 of the horizontal member 20, the horizontal member can be placed in any position relative to the vertical member with one portion extending beyond the vertical member in one direction farther than in the opposite direction, if desired, so that more cables can be placed on one side of the vertical member than on the other, for example.

The hangers 10 are extremely simple to install. The horizontal and vertical members 20 and 18 can be fastened together by the connection 24 with the stiffening member 40 fastened to the upper end of the vertical member 18 by the bolt 46, either at the job site or in a remote location prior to being brought to the site. The hanger is then affixed to the overhead 12 or the bulkhead 16 simply by fastening the weldable stud 22 thereto and then by bolting the vertical member 18 and the stiffening member 40 thereto by means of the bolt 42 to complete the installation. The stud can be welded to the overhead in a matter of a few seconds in accordance with the automatic arc welding technique discussed above. The cables 14, after being positioned on the deck below the hangers, can then simply be lifted into place and fastened to the horizontal member 20 by the straps 38. The cables 14 are lifted over the ends of the horizontal member 20 rather than having to be threaded through the cables, as discussed above.

A slightly modified cable hanger 76 is shown in FIGS. 7–9. The cable hanger 76 again basically includes a first, vertical elongate member 78, a second, horizontal elongate member 80, a weldable stud 82, and a connection 84. The vertical member 80 consists of a single leg or bar 86 of heavier stock than the vertical member 18 but without a stiffening leg. The vertical leg 86, however, has a plurality of uniformly-spaced openings 88 therealong with at least one upper opening in a bent portion 90 to receive the stud 82 and at least one lower opening for fastening the attachment 84. The horizontal member 80 again has two legs 92 and 94, each with a plurality of openings 96 spaced therealong. The stud 82, in this instance, is cylindrical in nature and has a lower threaded end on which a washer 98 and a nut 100 are received. For better rigidity, the hanger 76 can have a stiffening member 102 of L-shaped configuration with a first leg 104 parallel to the vertical member 78 and attached thereto by a bolt 106 and a nut 108, and a side or upper leg 110 abutting the overhead 12. The member 102 prevents the vertical member 78 from swinging in a direction parallel to the longitudinal extent of the cables while the bent portion 90 of the vertical member 78, held by the nut 100, prevents transverse movement of the hanger.

The connection 84, in this instance, includes a plate-like portion 112 with a central opening 114 therein. The connection 84 has a pair of directly or diametrically opposite legs 116 extending in a common direction from the plate-like portion 112 and a second pair of legs 118 directly or diametrically opposite the opening 114 and extending in a common direction from the plate-like portion 112 but, in this instance, extending in the same direction as the legs 116. The connection 84 is affixed to the vertical member 78 and the horizontal member 80 by a bolt 120 and a nut 122. However, in this instance, the connection 84 is not located between the vertical and horizontal members but is located with the plate-like portion 112 to one side of the vertical member 78, with the legs 116 and 118 extending on each side of the vertical member 78 and beyond the opposite side of the leg 86 to cooperate with upper and lower portions of the horizontal member 80. The legs 116 and 118 thereby are effective to prevent relative rotation between the vertical and horizontal members with one of the pair of legs engaging the vertical member and the other of the pair of legs engaging the horizontal member, depending upon the direction in which the horizontal member 80 has a tendency to rotate. It will be understood, however, that the connection 24 can be used with the hanger 76, if desired.

The hanger 76 also can be easily fabricated and installed. The horizontal and vertical members can be pre-assembled at the job site or at a remote location, along with the stiffening member 102, if used. The stud 82 is then simply arc welded to the overhead and, with the vertical member in place, the washer 98 and the nut 100 are added to complete the installation, after which the cables can be installed in the same manner as with the hanger 10.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. A cable hanger comprising a first elongate member having a plurality of openings spaced therealong, a support to be affixed to part of a ship, said support having a shank with a hole therein, a bolt extending through said shank and said elongate member affixing the two together, a second elongate member having a plurality of second openings spaced therealong, a connection for said members including a rectangular plate-like portion having a central hole therethrough, a pair of legs on opposite sides of said central hole extending in a common direction from said plate-like portion, said pair of legs being engageable with said first member, and a second pair of legs on opposite sides of said central hole and extending in a common direction from said plate-like portion, said second pair of legs being engageable wtih said second member, bolt means extending through said central hole of said connection and through openings of said first and second members affixing said members together, and means for holding cables on said second member on either side of said first member.

2. A cable hanger comprising a first elongate member having a plurality of openings spaced therealong, a weldable stud having an end to be welded to part of a ship, said stud having a shank with a hole therein, a bolt extending through said stud and said elongate member affixing the two together, a second elongate member having a plurality of second openings spaced therealong, a connection for said members including a rectangular plate-like portion having a central hole therethrough, a pair of legs on opposite sides of said central hole extending in a common direction from said plate-like portion, said pair of legs extending through two of said openings of said first member, and a second pair of legs on opposite sides of said central hole and extending in the opposite direction from said first pair, said second pair of legs extending through two of said openings of said second member, said two pair of legs lying on mutually perpendicular lines, bolt means extending through said central hole of said connection and through openings of said first and second members affixing said members together with said plate-like portion of said connection therebetween, and means for holding cables on said second member on either side of said first member.

3. A cable hanger comprising a first elongate member having a first opening at one end thereof, a second opening spaced from the first, and additional openings on each side of said second opening, a weldable stud having an end to be welded to part of a ship, said stud having a shank with a hole in the shank, a bolt extending through said stud and said elongate member affixing the two together, a second elongate member having a third opening and additional openings on each side thereof, a connection for said members including a rectangular plate-like portion having a central hole therethrough, a pair of legs on opposite sides of said central hole extending in a common direction from said plate-like portion, said pair of legs extending through said additional openings of said first member, and an additional pair of legs on opposite sides of said central hole extending in the opposite direction from said first pair, said second pair of legs extending through said additional opening of said second member, said two pair of legs lying on mutually perpendicular lines, bolt means extending through said central hole of said connection and through said second opening of said first member and said third opening of said second member affixing said members together with said plate-like portion of said connection therebetween, and means for holding cables on said second member on either side of said first member.

4. A cable hanger comprising a first elongate member, said first elongate member having a first opening at an intermediate portion thereof, means for connecting an upper end of said member to part of a ship, a second elongate member having a first leg substantially parallel with said first elongate member and a second leg extending outwardly therefrom in a direction opposite said first elongate member, said first leg having a second opening at an intermediate portion thereof, a connection for said members including a plate-like portion having a hole, four spaced legs extending in a common direction from said plate-like portion and extending past at least part of said first and second members, fastener means extending through said hole and said first and second openings to hold said connection, said first member, and said second member together and to prevent said second member from rotating relative to said first member and means for holding the cables against said second leg of said second member on either side of said first elongate member.

5. A cable hanger to be attached to part of a ship, said hanger comprising a first elongate member having a first leg and having a fastening hole extending therethrough at an upper portion thereof, said first member having a first opening spaced from said hole; a stiffening member having a first leg contiguous with said first leg of said first member and having a second fastening hole therethrough, said stiffening member having a second leg extending in a direction opposite to said first member; a weldable stud having an end with flux centrally located therein to facilitate welding said stud to the ship, said stud being fastened to said first member; a second elongate member having a second opening; connecting means for said first and second members; bolt means extending through said connecting means and through said first and second openings of said first and second members affixing said first and second members together; and means for holding cables on said second member on either side of said first member.

6. A cable hanger to be attached to part of a ship, said hanger comprising a first elongate member having a first leg and having a fastening hole extending therethrough at the upper end thereof, said first member having a side leg extending from said first leg at one side of said hole, said member also having a first opening spaced from said hole; a stiffening member having a first leg contiguous with said first leg of said first member and having a second fastening hole therethrough, said stiffening member having a side leg extending in a direction opposite to the first side leg; a weldable stud having an end with flux centrally located therein to facilitate welding said stud to the ship, said stud having a shank parallel to the first legs of said members, said stud having a shank hole extending therethrough to be aligned with said fastening holes of said members, said stud having a straight edge at one side of said shank cooperating with said side leg of said stiffening member to prevent pivotal movement of said first member relative to said stud in one direction; a bolt extending through said fastening holes and said shank hole to attach said members to said stud; a second elongate member having a second opening; a connection for said first and second members including a rectangular plate-like portion having a central hole therethrough, a pair of legs on opposite sides of said central hole and extending in a common direction from said plate-like portion, said pair of legs being engageable with said first member, and an additional pair of legs on opposite sides of said central hole and extending in a common direction from said plate-like portion, said second pair of legs being engageable with said second member; bolt means extending through said central hole of said connection and through said first and second openings of said first and second members affixing said first and second members together; and means for holding cables on said second member on either side of said first member.

7. A cable hanger to be attached to part of a ship, said hanger comprising a first elongate member having a bent end portion with a stud hole therethrough, and a fastening hole extending through an upper portion of said member, said first member having a first opening spaced below said fastening hole; a stiffening member having a first leg contiguous with an upper portion of said elongate member and having a second fastening hole therethrough, said stiffening member having a second leg parallel to said bent portion of said first member and extending in a direction opposite thereto; fastening means extending through said first and second fastening holes of said first member and said stiffening member; a weldable stud having an end with flux centrally located therein to facilitate welding said stud to the ship, said stud extending through said stud hole of said first member and having means fastening said stud to said first member; a second elongate member having a second opening; a connection for said first and said second members including a plate-like portion having a central hole therethrough, a pair of legs on opposite sides of said central hole and extending in a common direction from said plate-like portion, said pair of legs being engageable with said first member, and an additional pair of legs on opposite sides of said central hole and extending in a common direction from said plate-like portion, said second pair of legs being engageable with said second member; and fastening means extending through said central hole of said connection and through said first and second openings of said first and second members affixing said first and second members together.

8. A cable hanger to be attached to part of a ship, said hanger comprising a first elongate member having a flat leg at the upper end thereof and having a hole extending therethrough, said first member having means extending from said leg at one side of said hole, a second elongate member having a portion affixed to said first member below said upper end, an end weldable stud having an end with flux centrally located therein to facilitate welding said stud to the ship, said stud having a flat shank parallel to the flat leg of said first elongate member, said stud having a hole extending therethrough to be aligned with said hole of said first member, and said stud having a straight edge at one side of said surface cooperating with said extending means of said first elongate member to prevent pivotal movement of said first member relative to said stud, and a fastener extending through said holes to attach said first member to said stud.

9. A cable hanger to be attached to part of a ship, said hanger comprising a first elongate member having a flat leg at the upper end thereof and having a hole extending therethrough, said first member having a side wall extending from said leg at one side of said hole, a second elongate member having a central portion affixed to said first member below said upper end, an end weldable stud having an end with flux centrally located therein to facilitate welding said stud to the ship, said stud having a flat shank parallel to the flat leg of said vertical elongate member, said stud having a hole extending therethrough to be aligned with said hole of said first member, and said stud having a straight edge at one side of said shank cooperating with said side wall of said first elongate member to prevent pivotal movement of said first member relative to said stud, and a bolt extending through said holes to attach said first member to said stud.

10. A connection for affixing a second member to a first member of a cable hanger comprising a rectangular plate-like portion having a central hole therethrough, only one pair of legs on diametrically opposite sides of said central hole extending in a common direction from said plate-like portion, said pair of legs adapted to engage at least one of the first and second members of the cable hanger, and only one additional pair of legs on diametrically opposite sides of said central hole extending from said plate-like portion in the opposite direction from the first pair, said second pair of legs adapted to engage at least the other of said first and second members, said two pair of legs lying on mutually perpendicular lines crossing at the center of said central hole.

11. A cable hanger comprising a first elongate member having a plurality of openings spaced therealong, means for affixing a portion of said elongate member to part of a ship, a second elongate member having a plurality of second openings spaced therealong, a connection for said members including a rectangular plate-like portion having a central hole therethrough, a pair of legs on opposite sides of said central hole extending in a common direction from said plate-like portion, said pair of legs being engageable with said first member, and a second pair of legs on opposite sides of said central hole and extending in a common direction from said plate-like portion, said second pair of legs being engageable with said second member, fastener means extending through said central hole of said connection and through openings of said first and second members affixing said members together, and means for holding cables on said second member on either side of said first member.

12. A cable hanger comprising a first elongate member having a plurality of openings spaced therealong, means for affixing a portion of said elongate member to part of a ship, a second elongate member having a plurality of second openings spaced therealong, a connection for said members including a rectangular plate-like portion having a central hole therethrough, a pair of legs on opposite sides of said central hole extending in a common direction from said plate-like portion, said pair of legs extending through two of said openings of said first member, and a second pair of legs on opposite sides of said central hole and extending in the opposite direction from said first pair, said second pair of legs extending through two of said openings of said second member, said two pair of legs lying on mutually perpendicular lines, fastener means extending through said central hole of said connection and through openings of said first and second members affixing said members together with said plate-like portion of said connection therebetween, and means for holding cables on said second member on either side of said first member.

References Cited

UNITED STATES PATENTS

| 263,426 | 8/1882 | O'Brien | 287—54 X |
| 2,339,565 | 1/1944 | Goldberg et al. | 248—62 |
| 3,173,639 | 3/1965 | Dunn | 248—65 |
| 3,199,815 | 8/1965 | Martinkovic et al. | 248—59 |
| 3,231,945 | 2/1966 | Miller et al. | 20—92 |

ROY D. FRAZIER, *Primary Examiner.*

J. F. FOSS, *Assistant Examiner.*